US011230959B2

(12) United States Patent
Gomez et al.

(10) Patent No.: US 11,230,959 B2
(45) Date of Patent: Jan. 25, 2022

(54) ASPIRATION SYSTEM FOR A WORK VEHICLE INCLUDING AN ADJUSTABLY-SIZED VENTURI SECTION

(71) Applicant: CNH Industrial America LLC, New Holland, PA (US)

(72) Inventors: Lorenzo Anthony Gomez, Schiller Park, IL (US); Mark Douglas Klassen, Lockport, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/737,423

(22) Filed: Jan. 8, 2020

(65) Prior Publication Data

US 2021/0207739 A1   Jul. 8, 2021

(51) Int. Cl.
  *F01N 3/22*   (2006.01)
  *F01N 3/30*   (2006.01)
  *F01N 3/34*   (2006.01)
(52) U.S. Cl.
  CPC ............. *F01N 3/303* (2013.01); *F01N 3/225* (2013.01); *F01N 3/30* (2013.01); *F01N 3/34* (2013.01); *F01N 2240/20* (2013.01); *F01N 2270/00* (2013.01); *F01N 2470/30* (2013.01)
(58) Field of Classification Search
  CPC ... F01N 1/14; F01N 3/30; F01N 3/303; F01N 2240/20; F01N 2270/00; F01N 2470/30; F01N 2550/14
  See application file for complete search history.

(56) References Cited

U.S. PATENT DOCUMENTS

| 2,066,544 A | * | 1/1937 | Shaw .................. F02M 19/085 |
| | | | 261/62 |
| 3,143,293 A | * | 8/1964 | Purse ....................... F01N 3/34 |
| | | | 239/397.5 |
| 4,155,725 A | | 5/1979 | Van Ackeren et al. |

(Continued)

FOREIGN PATENT DOCUMENTS

| JP | H09236013 | 9/1997 |
| WO | WO2017/196367 | 11/2017 |

OTHER PUBLICATIONS

Machine translation of JP H09-236013 A, accessed Mar. 22, 2021. (Year: 2021).*

(Continued)

*Primary Examiner* — Jonathan R Matthias
(74) *Attorney, Agent, or Firm* — Rickard K. DeMille; Rebecca L. Henkel

(57) ABSTRACT

In one aspect, an aspiration system for a work vehicle includes an exhaust tube extending along a flow direction from an upstream end to a downstream end. The exhaust tube defines an exhaust passage extending from the upstream end of the exhaust tube to the downstream end of the exhaust tube. The exhaust tube includes a venturi portion. The aspiration system also includes an aspiration tube in flow communication with the venturi portion and configured to receive an aspirated airflow. The system further includes a flow adjustment mechanism provided in operative association with venturi portion such that the flow adjustment mechanism is configured to adjust a cross-sectional flow area of the venturi portion of the exhaust tube.

19 Claims, 7 Drawing Sheets

(56) References Cited

U.S. PATENT DOCUMENTS

| | | | |
|---|---|---|---|
| 5,611,204 A * | 3/1997 | Radovanovic | F02M 26/19 |
| | | | 123/574 |
| 5,662,086 A * | 9/1997 | Piccinini | F02M 9/10 |
| | | | 123/184.56 |
| 6,343,594 B1 | 2/2002 | Koeslin et al. | |
| 7,040,451 B2 | 5/2006 | Schumacher et al. | |
| 7,261,096 B2 * | 8/2007 | Berggren | F02D 9/12 |
| | | | 123/568.17 |
| 7,353,811 B2 | 4/2008 | Weisz | |
| 7,833,301 B2 | 11/2010 | Schindler et al. | |
| 7,878,171 B2 | 2/2011 | Vandike et al. | |
| 7,896,128 B2 | 3/2011 | De Leo et al. | |
| 8,151,774 B2 | 4/2012 | Mccauley | |
| 10,100,702 B2 | 10/2018 | Zhang | |
| 10,227,958 B2 | 3/2019 | Meyer et al. | |
| 2007/0199549 A1 * | 8/2007 | Weisz | F02M 35/10137 |
| | | | 123/568.18 |
| 2020/0149456 A1 * | 5/2020 | Smiljanovski | F01N 3/106 |

OTHER PUBLICATIONS

Air Intake Pre-Cleaners, Donaldson Engine & Vehicle, Pre-Cleaners, Extend the Life of Your Air Filters, retrived Apr. 23, 2019 (10 pages) https://www.donaldson.com/en-us/engine/filters/products/air-intake/accessories/pre-cleaners/.

* cited by examiner

ASPIRATION SYSTEM FOR A WORK VEHICLE INCLUDING AN ADJUSTABLY-SIZED VENTURI SECTION

FIELD

The present disclosure generally relates to work vehicles and, more particularly, to an aspiration system that utilizes an adjustable cross-sectional flow area of a venturi section of an exhaust passage through which exhaust gases of a work vehicle are directed to maintain proper exhaust flow surrounding an associated aspiration tube of the work vehicle.

BACKGROUND

Work vehicles typically include internal combustion engines that require clean air for use within the combustion process. Since many work vehicles, such as harvesters and other agricultural work vehicles, operate in fields and other harvesting environments in which the ambient air contains large amounts of dust, plant matter, debris, particulates, and other particles, an air intake system providing effective air filtration is required. As such, air intake systems typically include a pre-cleaner positioned upstream of an air filter. In general, the pre-cleaner is configured to remove larger particles from the air entering the engine, while the air filter is configured to remove smaller particles that pass through the pre-cleaner.

To prevent the air filter from clogging, the large particulates separated from the intake air by the pre-cleaner must be removed from the pre-cleaner. Typically, the pre-cleaner is fluidly coupled to an aspiration or vacuum source, such as an exhaust tube of the work vehicle. As such, with exhaust gases flowing through the exhaust tube, a vacuum is created within the pre-cleaner, which draws particles out of the pre-cleaner. However, the vacuum pressure applied to the pre-cleaner by conventional configurations is often inadequate during certain operating conditions of the work vehicle, such as at an idle condition or low power output of an engine of the work vehicle. As such, the amount of particulates that can be removed from the incoming air by the pre-cleaner may be limited at such operating conditions, causing the air filter to plug within a short period of time.

Accordingly, an improved aspiration system for a work vehicle that provides greater aspiration or vacuum to the vehicle's air intake or filtration system at a wider range of operating conditions of the work vehicle would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to an aspiration system for a work vehicle. The system includes an exhaust tube extending along a flow direction from an upstream end to a downstream end. The exhaust tube defines an exhaust passage extending from the upstream end of the exhaust tube to the downstream end of the exhaust tube. The exhaust tube also includes a venturi portion. The aspiration system also includes an aspiration tube in flow communication with the venturi portion and configured to receive an aspirated airflow. The system further includes a flow adjustment mechanism provided in operative association with the venturi portion such that the flow adjustment mechanism is configured to adjust a cross-sectional flow area of the venturi portion of the exhaust tube.

In another aspect, the present subject matter is directed to a work vehicle. The work vehicle includes an engine and an air filtration system configured to filter air provided to the engine. The work vehicle also includes an exhaust tube extending along a flow direction from an upstream end to a downstream end. The exhaust tube defines an exhaust passage extending from the upstream end of the exhaust tube to the downstream end of the exhaust tube. The exhaust tube includes a venturi portion. The work vehicle also includes an aspiration tube coupled between the air filtration system and the exhaust tube. The aspiration tube defines an aspiration passage extending between the air filtration system and the exhaust tube. Furthermore, the work vehicle includes a flow adjustment mechanism provided in operative association with the venturi portion such that the flow adjustment mechanism is configured to adjust a cross-sectional flow area of the venturi portion of the exhaust tube.

In a still further aspect, the present subject matter is directed to a method of aspirating an air filtration system of a work vehicle. The air filtration system includes an aspiration tube in fluid communication with an exhaust tube of the work vehicle. The method includes monitoring, with a computing device, an operating parameter of an engine of the work vehicle. The method further includes adjusting, with the computing device, a cross-sectional flow area of a venturi portion of the exhaust tube based at least in part on the monitored operating parameter of the engine. Additionally, the method includes generating an aspirated airflow through the aspiration tube via the venturi portion to remove particulates from the air filtration system.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
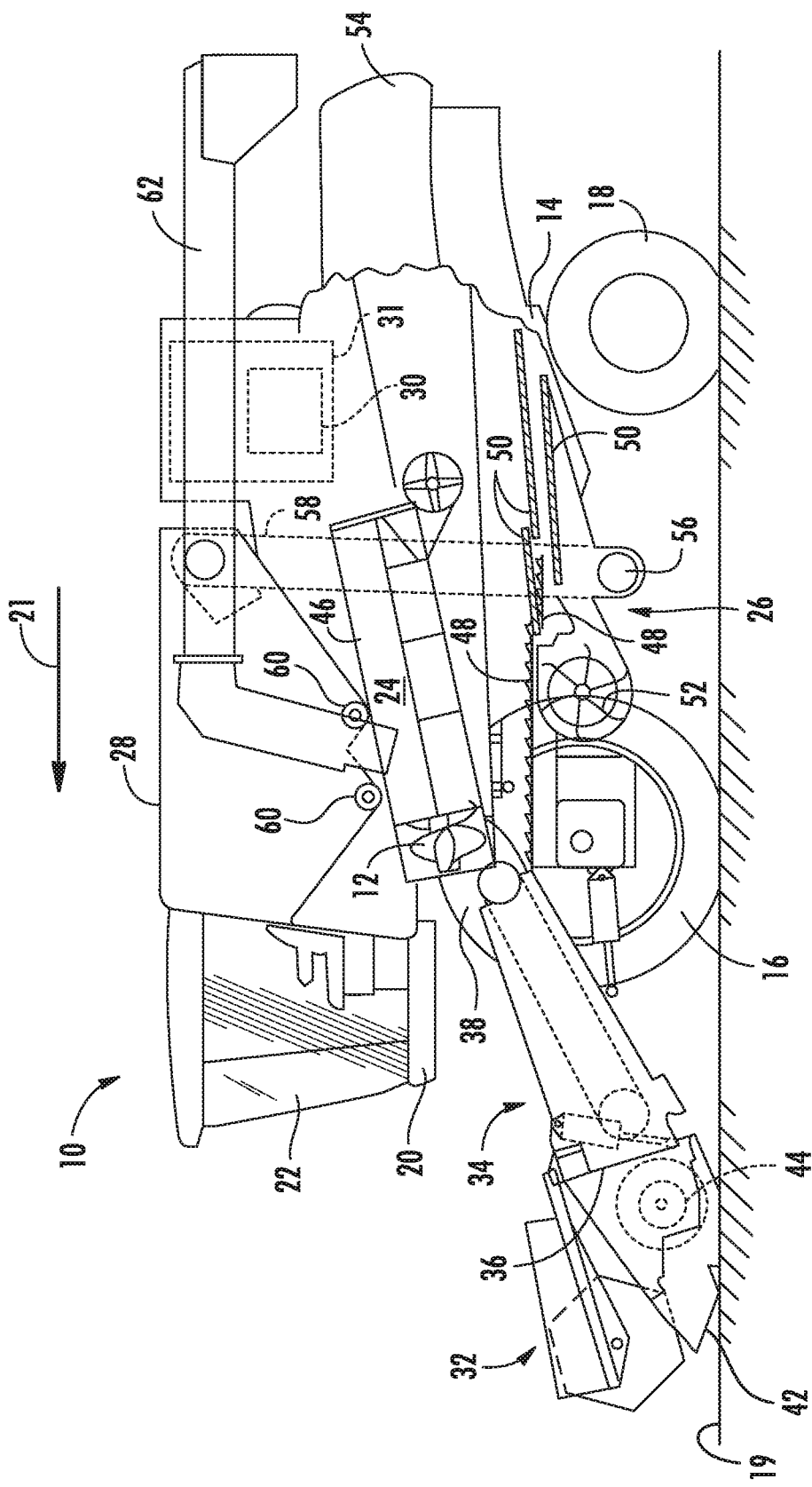
FIG. 1 illustrates a side view of one embodiment of work vehicle in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an aspiration system for a work vehicle. Specifically, in several embodiments, the aspiration system may include an exhaust tube defining an exhaust passage through which exhaust gases from an engine of the work vehicle are directed. The exhaust tube includes a venturi portion. The aspiration system also includes an aspiration tube defining an aspiration passage therein fluidly connected to the venturi portion to receive an aspirated airflow. For instance, the aspiration tube may be configured to extend between the venturi portion of the exhaust passage and a separate component of an air filtration system of the work vehicle, such as a pre-cleaner of the air filtration system. As such, when exhaust gases flow through the exhaust passage of the exhaust tube, a vacuum may be created within the aspiration passage so as to aspirate or provide a vacuum to the pre-cleaner, thereby removing particles from the pre-cleaner.

Furthermore, in accordance with aspects of the present subject matter, system may include a flow adjustment mechanism provided in operative association with the venturi portion of the exhaust tube, such as by providing the flow adjustment mechanism in operative association with a throat of the venturi portion. In general, the flow adjustment mechanism is configured to adjust a cross-sectional flow area of the venturi portion to vary the speed of the exhaust gases flowing through the exhaust passage, thereby adjusting the vacuum applied through the aspiration tube to the pre-cleaner. As such, the disclosed aspiration system may provide greater aspiration to the pre-cleaner than conventional aspiration systems. Additionally, or alternatively, the flow adjustment mechanism may also be configured to adjust the cross-sectional flow area of the venturi portion to allow any backpressure within the exhaust tube to be reduced.

It should be appreciated that, in general, the present subject matter will be described herein as being used to aspirate the pre-cleaner of a vehicle's air filtration system. However, in other embodiments, the disclosed aspiration system may be utilized as an aspiration source for any other suitable component of the work vehicle.

Referring now to the drawings, FIG. 1 illustrates a simplified, partial sectional side view of one embodiment of a work vehicle 10. As shown, the work vehicle 10 may be configured as an axial-flow type combine in which crop material is threshed and separated while it is advanced by and along a longitudinally arranged rotor 12. The work vehicle 10 may include a chassis or main frame 14 having a pair of driven, ground-engaging front wheels 16 and a pair of steerable rear wheels 18. The wheels 16, 18 may be configured to support the work vehicle 10 relative to a ground surface 19 and move the work vehicle 10 in a forward direction of travel 21 relative to the ground surface 19. Additionally, an operator's platform 20 with an operator's cab 22, a threshing and separating assembly 24, a grain cleaning assembly 26, and a crop tank 28 may be supported by the frame 14. Furthermore, as is generally understood, the work vehicle 10 may include an engine 30 mounted on the frame 14 and positioned within an engine compartment 31. A transmission (not shown) may be operably coupled to the engine 30 and may provide variably adjusted gear ratios for transferring engine power to the wheels 16, 18 via a drive axle assembly (or via axles if multiple drive axles are employed).

Moreover, as shown in FIG. 1, a harvesting implement (e.g., a header 32) and an associated feeder 34 may extend forward of the main frame 14 and may be pivotally secured thereto for generally vertical movement. In general, the feeder 34 may be configured to serve as support structure for the header 32. As shown in FIG. 1, the feeder 34 may extend between a front end 36 coupled to the header 32 and a rear end 38 positioned adjacent to the threshing and separating assembly 24. As is generally understood, the rear end 38 of the feeder 34 may be pivotally coupled to a portion of the work vehicle 10 to allow the front end 36 of the feeder 34 and, thus, the header 32 to be moved upwardly and downwardly relative to the ground 19 to set the desired harvesting or cutting height for the header 32.

As the work vehicle 10 is propelled forwardly over a field with standing crop, the crop material is severed from the stubble by a sickle bar 42 at the front of the header 32 and delivered by a header auger 44 to the front end 36 of the feeder 34, which supplies the harvested crop to the threshing and separating assembly 24. As is generally understood, the threshing and separating assembly 24 may include a cylindrical chamber 46 in which the rotor 12 is rotated to thresh and separate the harvested crop received therein. That is, the harvested crop is rubbed and beaten between the rotor 12 and the inner surfaces of the chamber 46, whereby the grain, seed, or the like, is loosened and separated from the straw.

The harvested crop which has been separated by the threshing and separating assembly 24 falls onto a series of pans 48 and associated sieves 50, with the separated harvested crop being spread out via oscillation of the pans 48 and/or sieves 50 and eventually falling through apertures defined in the sieves 50. Additionally, a cleaning fan 52 may be positioned adjacent to one or more of the sieves 50 to provide an air flow through the sieves 50 that remove chaff and other impurities from the harvested crop. For instance, the fan 52 may blow the impurities off of the harvested crop for discharge from the work vehicle 10 through the outlet of a straw hood 54 positioned at the back end of the work vehicle 10.

The cleaned harvested crop passing through the sieves 50 may then fall into a trough of an auger 56, which may be configured to transfer the harvested crop to an elevator 58 for delivery to the associated crop tank 28. Additionally, in one embodiment, a pair of tank augers 60 at the bottom of the crop tank 28 may be used to urge the cleaned harvested crop sideways to an unloading tube 62 for discharge from the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For instance, in one embodiment, the work vehicle may be configured as an agricultural tractor.

Figure 2:
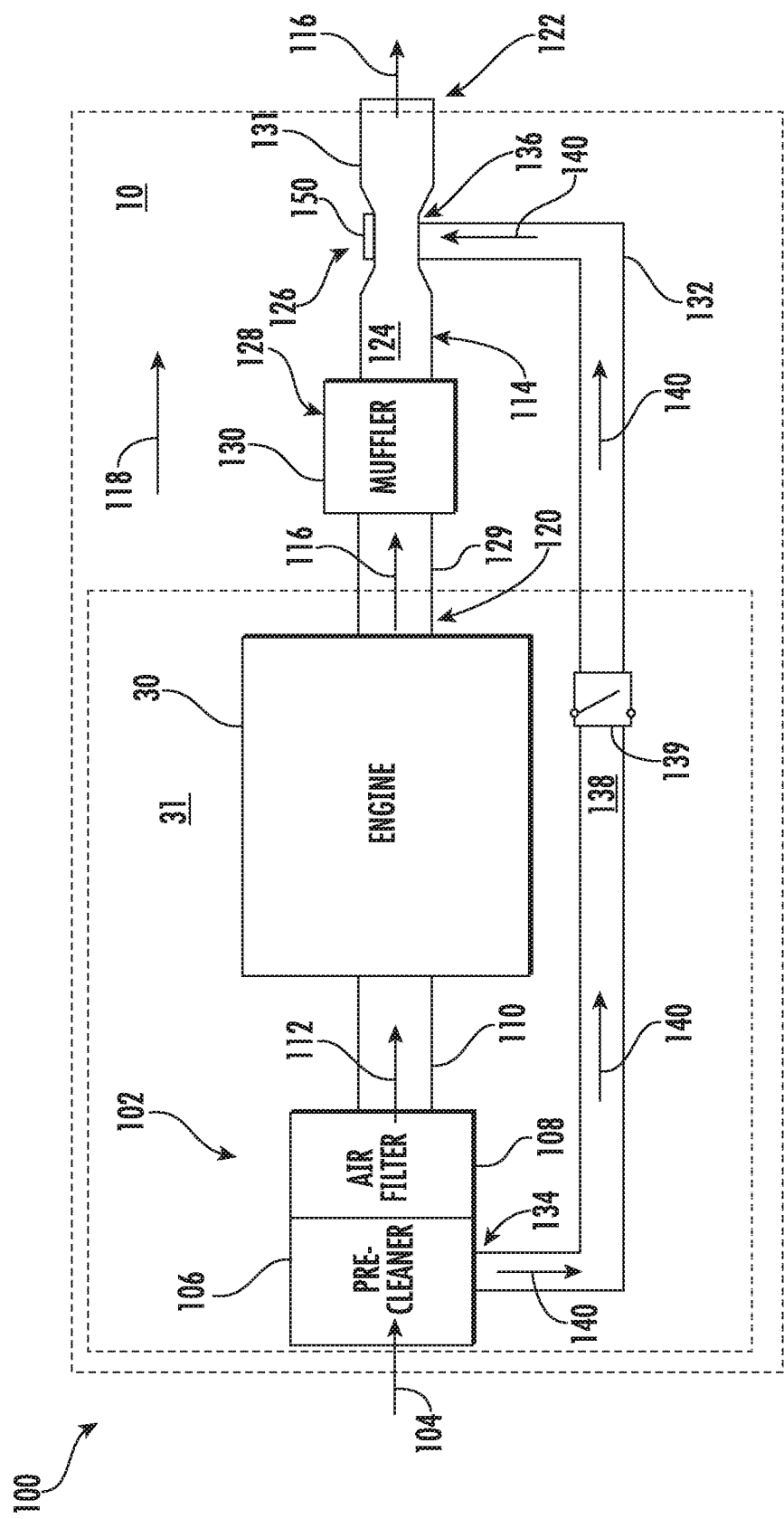
FIG. 2 illustrates a schematic view of one embodiment of an aspiration system for a work vehicle in accordance with aspects of the present subject matter.

Referring now to FIG. 2, a schematic, side view of one embodiment of an aspiration system 100 for aspirating a component of a work vehicle is illustrated in accordance with aspects of the present subject matter. In general, the aspiration system 100 will be described herein with reference to the work vehicle 10 described above with reference to FIG. 1. However, it should be appreciated by those of ordinary skill in the art that the disclosed system 100 may generally be utilized with work vehicles having any other suitable work vehicle configuration.

As shown in FIG. 2, the aspiration system 100 may include various components of the work vehicle 10. For example, in one embodiment, the aspiration system 100 may include the engine 30 of the work vehicle 10. However, it should be appreciated that, in alternative embodiments, the aspiration system 100 may include any other suitable components of the work vehicle 10. For instance, the aspiration system 100 may be equally suitable for use in association with a turbocharger or a work vehicle 10 including a turbocharger.

Moreover, the aspiration system 100 may include an air filtration system 102 configured to filter intake air (e.g., as indicated by arrow 104 in FIG. 2) entering the engine 30 for use in the combustion process. Specifically, in several embodiments, the air filtration system 102 may include a pre-cleaner 106. In general, the pre-cleaner 106 may be configured to remove particles present in the intake air 104 flowing through the pre-cleaner 106. For example, as will be described below, the pre-cleaner 106 may be aspirated or provided with a vacuum that draws the particles present within the pre-cleaner 106 out of the flow of the intake air 104. The air filtration system 102 may also include an air filter 108 positioned downstream of the pre-cleaner 106. In general, the air filter 108 may be configured to remove particles remaining in the intake air 104 as the intake air 104 passes through the air filter 108. For example, in one embodiment, the air filter 108 may be at least partially formed from a fibrous, porous, or mesh material that permits the intake air 104 to flow through the air filter 108, while trapping or capturing particles still present in the intake air 104. Additionally, an intake conduit 110 may fluidly couple the air filtration system 102 and the engine 30 so as to provide filtered air (e.g., as indicated by arrow 112 in FIG. 2) from the air filtration system 102 to the engine 30 for use in the combustion process. However, it should be appreciated that, in alternative embodiments, the air filtration system 102 may have any other suitable configuration.

As shown in FIG. 2, the air filtration system 102 may be mounted or positioned within the engine compartment 31 of the work vehicle 10. However, one of ordinary skill in the art would appreciate that the air filtration system 102 may be mounted or positioned in any other suitable location of the work vehicle 10, such as outside of the engine compartment 31.

Furthermore, the aspiration system 100 may also include an exhaust tube 114 configured to convey exhaust gases (e.g., as indicated by arrows 116 in FIG. 2) from the engine 30 to a location outside of the engine compartment 31 of the work vehicle 10. Specifically, in several embodiments, the exhaust tube 114 may extend along a flow direction (e.g., as indicated by arrow 118 in FIG. 2) from an upstream end 120 of the exhaust tube 114 to a downstream end 122 of the exhaust tube 114. In general, the exhaust tube 114 may define an exhaust passage 124 extending from the upstream end 120 of the exhaust tube 114 to the downstream end 122 of the exhaust tube 114 through which the exhaust gases 116 may flow. As such, the upstream end 120 of the exhaust tube 114 may be coupled to the engine 30 (e.g., an exhaust manifold of the engine 30) such that the exhaust gases 116 flow into the exhaust passage 124 from the engine 30. The downstream end 122 of the exhaust tube 114 may generally be positioned outside of the engine compartment 31 and/or the work vehicle 10 so as to allow the exhaust gases 116 flowing through the exhaust tube 114 to be exhausted into an ambient atmosphere outside of the engine compartment 31 and/or the work vehicle 10. As will described below, the exhaust tube 114 may include a venturi portion 126 positioned between the upstream and downstream ends 120, 122 of the exhaust tube 114.

Moreover, the aspiration system 100 may include one or more exhaust gas conditioning devices 128. In general, the exhaust gas conditioning device(s) 128 may be configured to adjust or condition a characteristic (e.g., sound, chemical content, etc.) of the exhaust gases 116 flowing through the exhaust passage 124. For example, as shown in FIG. 2, in one embodiment, the exhaust gas conditioning device(s) 128 may be configured as a muffler 130. In this regard, as is generally understood, the muffler 130 may include various baffles, passages, acoustic insulation packets, and/or the like, which are configured to reduce an intensity or volume of a sound emitted by the exhaust gases 116 and/or the combustion process. However, it should be appreciated that, in alternative embodiments, the exhaust gas conditioning device(s) 128 may be configured as any other suitable exhaust gas conditioning device, such as a catalytic converter or a particulate filter. Furthermore, it should be appreciated that the aspiration system 100 may include a combination of any suitable exhaust gas conditioning devices 128. For example, in one embodiment, the aspiration system 100 may include a catalytic converter, a particulate filter, and the muffler 130.

In several embodiments, the exhaust gas conditioning device(s) 128 may be positioned at a location(s) upstream of the venturi portion 126 of the exhaust tube 114. For example, as shown in FIG. 2, the muffler 130 may be positioned such that an upstream exhaust tube section 129 of the exhaust tube 114 extends between the upstream end 120 of the exhaust tube 114 and the muffler 130, and a downstream exhaust tube section 131 of the exhaust tube 114 extends between the muffler 130 and the downstream end 122 of the exhaust tube 114. In such embodiment, the venturi portion 126 may be positioned within and/or form part of the downstream exhaust tube section 131. However, it should be appreciated that, in alternative embodiments, the exhaust gas conditioning device(s) 128 may be positioned and/or integrated within the exhaust tube 114 at any other suitable location, including location(s) downstream of the venturi portion 126.

In accordance with aspects of the present subject matter, the aspiration system 100 may further include an aspiration tube 132. In general, and as will be described below, the aspiration tube 132 may be configured to aspirate or provide a vacuum to the pre-cleaner 106 so as to allow particles to be removed from the intake air 104 flowing through the pre-cleaner 106. Specifically, in several embodiments, the aspiration tube 132 may extend from an upstream end 134 of the aspiration tube 132 to a downstream end 136 of the aspiration tube 132. In general, the aspiration tube 132 may define an aspiration passage 138 extending from the upstream end 134 of the aspiration tube 132 to the downstream end 136 of the aspiration tube 132 through which aspirated airflow (e.g., as indicated by arrows 140 in FIG. 2) may flow so as to aspirate the pre-cleaner 106. As such, the upstream end 134 of the aspiration tube 132 may be coupled to the pre-cleaner 106 so that the aspirated airflow 140 flows into the aspiration passage 138 from the pre-cleaner 106. The downstream end 136 of the aspiration tube 132 may be coupled to the venturi portion 126 of the exhaust tube 114 such that the aspirated airflow 140 flows into the exhaust passage 124 from the aspiration passage 138. However, it should be appreciated that, in alternative embodiments, the upstream end 134 of the aspiration tube 132 may be coupled to any other suitable component of the work vehicle 10 that is separate from the exhaust tube 114 so as to provide aspiration to that component. Additionally, as shown, a valve 139 may be disposed within aspiration tube 132 in order to restrict or close off the aspiration passage 138. For example, the valve 139 may be controllable to reduce or close-off the aspirated airflow 140.

As further illustrated in FIG. 2, and described in more detail below, the aspiration system 100 may further include a flow adjustment mechanism 150 provided in operative association with the venturi portion 126 of the exhaust tube 114. Generally, the flow adjustment mechanism 150 may be configured to adjust a cross-sectional flow area of the venturi portion 126. As such, the flow adjustment mechanism 150 may be used, for example, to narrow or throttle the venturi portion 126, and thus reduce a cross-sectional flow area of the venturi portion 126, in order to accelerate the exhaust gases 116 flowing therethrough and thereby reduce a static pressure of such exhaust gases 116 at the venturi portion 126. By reducing the static pressure of the exhaust gases 116 at the venturi portion 126, the venturi portion 126 may generate an enhanced aspirated airflow 140 through the aspiration passage 138 in order to remove particulates from the air filtration system 102, such as from the pre-cleaner 106. Contrarily, the flow adjustment mechanism 150 may be used to expand the venturi portion 126, and thus increase the cross-sectional flow area of the venturi portion 126, in order to reduce the acceleration of the exhaust gases 116 flowing therethrough and thereby increase the static pressure of such exhaust gases 116 at the venturi portion 126. Moreover, by decreasing the velocity of the exhaust gases 116 at the venturi portion 126, any undesirable backpressure within the exhaust tube 114 may be avoided or reduced. However, it should be appreciated that decreasing the local velocity of the exhaust gases 116 through the venturi portion 126, and thereby increasing the static pressure of the exhaust gases 116 at the venturi portion 126, may also reduce the vacuum level supplied to the aspiration passage 138 and thus reduce the generated aspirated airflow 140.

Figure 3:
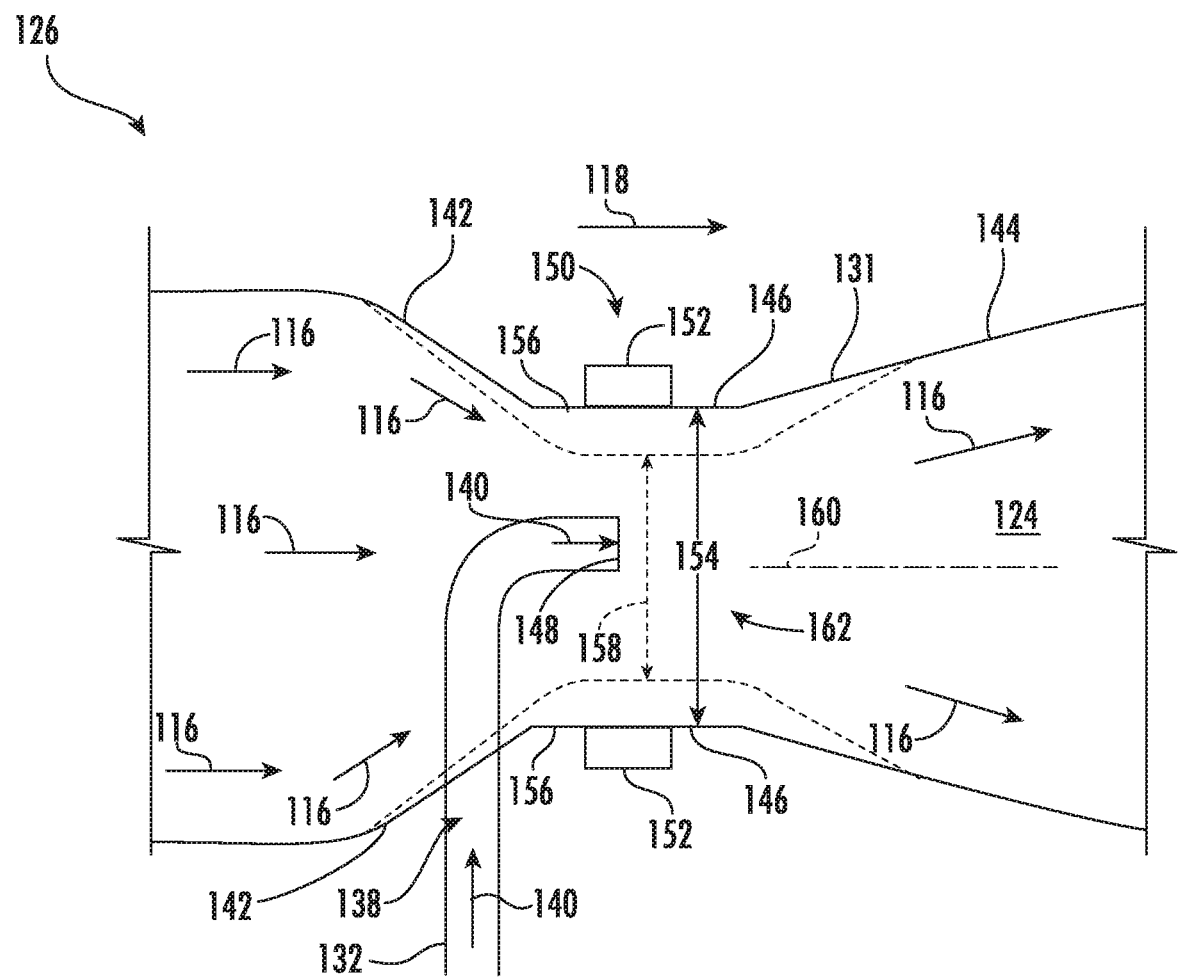
FIG. 3 illustrates a cross-sectional view of one embodiment of a venturi portion of an exhaust tube suitable for use within the disclosed aspiration system in accordance with aspects of the present subject matter, particularly illustrating one embodiment of a flow adjustment mechanism of the aspiration system.

Referring now to FIG. 3, a cross-sectional view of one embodiment of the venturi portion 126 of the exhaust tube 114 described above is illustrated in accordance with aspects of the present subject matter. As shown, the venturi portion 126 may include a converging section 142 and a diverging section 144. In general, a diameter of the exhaust tube 114 may narrow or contract along the flow direction 118 of the exhaust gases 116 within the converging section 142 of the venturi portion 126. Conversely, the diameter of the exhaust tube 114 may expand along the flow direction 118 of the exhaust gases 116 within the diverging section 144 of the venturi portion 126. Furthermore, the venturi portion 126 may include a throat 146 extending between the converging and diverging sections 142, 144. In this regard, the section of the exhaust passage 124 defined by the venturi portion 126 may contract and then expand along the flow direction 118 so as to increase the speed of the exhaust gases 116 that are flowing through the exhaust passage 124. As will be described below, the increased speed of the exhaust gases 116 through the venturi portion 126 may create a vacuum within the aspiration passage 138 of the aspiration tube 132.

Further, as shown, the aspiration tube 132 may, in one embodiment, extend through the exhaust tube 114 in order to fluidly couple the exhaust passage 124 and the aspiration passage 138 so as to permit the aspirated airflow 140 to flow into the exhaust passage 124 from the aspiration passage 138. For instance, in the embodiment of FIG. 3, an outlet end 148 of the aspiration tube 132 may be positioned within the venturi portion 126 such that the flow of the exhaust gases 116 past the outlet end 148 generates the aspirated airflow 140 through the aspiration passage 138. In one instance, as illustrated, the outlet end 148 of the aspiration tube 132 may be positioned at the throat 146 of the venturi portion 126 at or approximately at a centerline 160 of the venturi portion 126. Additionally, or alternatively, the venturi portion 126 of the exhaust tube 114 may define an aperture that fluidly couples the exhaust passage 124 and the aspiration passage 138 so as to permit the aspirated airflow 140 to flow into the exhaust passage 124 from the aspiration passage 138. Specifically, in several embodiments, the aperture may be at least partially defined by or through the throat 146 of the venturi portion 126. Furthermore, in one embodiment, the aperture may correspond to a circumferentially extending slot defined around a circumference of the exhaust tube 114. In such embodiment, an annular manifold may be coupled between the aspiration tube 132 and the exhaust tube 114 such that the aspirated airflow 140 may flow into the exhaust passage 124 from the aspiration passage 138 throughout the entire circumference of the aperture. However, one of ordinary skill in the art would appreciate that, in alternative embodiments, the outlet end 148 and/or aperture(s) may have any other suitable shape or configuration and/or be defined by any other suitable region of the venturi portion 126. For example, in one embodiment, a plurality of aspiration tubes 132 may fluidly couple the exhaust passage 124 to the air filtration system 102 to permit aspirated airflows 140 to flow into the exhaust passage 124 from a plurality of associated aspiration passages 138. Additionally, in a further embodiment, the aperture may be at least partially defined by and/or through the converging and/or diverging sections of the venturi portion 126.

Referring now to FIGS. 2 and 3, as indicated above, in several embodiments, the aspiration system 100 may be configured to aspirate or provide a vacuum to the pre-cleaner 106 of the air filtration system 102 to remove particles from the intake air 104 flowing through the pre-cleaner 106. During operation of the work vehicle 10, the exhaust gases 116 produced by the engine 30 may flow through the exhaust passage 124 in the flow direction 118. In this regard, the venturi portion 126 may be configured to adjust a flow parameter of exhaust gases 116 flowing through the exhaust passage 124. For example, in one embodiment, the flow adjustment mechanism 150 and the venturi portion 126 may be configured to increase the velocity or speed of the exhaust gases 116 as the exhaust gases 116 flow through the throat 146 of the venturi portion 126.

In certain situations, the velocity or speed of the exhaust gases 116 flowing through the venturi portion 126 may not be high enough to create a vacuum or low pressure area within the venturi portion 126 sufficient to remove impurities, particulates, or the like from the air filtration system 102 to the degree desired or required. For instance, in low RPM or power output conditions of the engine 30, such as idle conditions, the speed and/or velocity of the exhaust gases 116 may not be high enough to create a sufficient vacuum level. This may be particularly true when the throat 146 is sized for working or loaded conditions of the engine 30. In such instance, the air filter 108 may become clogged prematurely and require replacement sooner than when the intake air 104 has been properly aspirated to remove such particles present in the intake air 104 passing through the pre-cleaner 106. As such, by adjusting the cross-sectional area of the throat 146 of the venturi portion 126, the velocity of the exhaust gases 116 may be locally increased at the throat 146, thereby provided a lower pressure zone and more effectively aspirating particles from the pre-cleaner 106.

More specifically, in the illustrated embodiment, the flow adjustment mechanism 150 may reduce the cross-sectional area of the venturi portion 126 to increase the speed of the exhaust gases 116 flowing around the outlet end 148 of the aspiration tube 132. For instance, the converging section 142 and the restricted throat 146 of the venturi portion 126 may further reduce the cross-sectional area of the exhaust passage 124 to increase the speed of the exhaust gases 116 flowing through throat 146. The increased speed of the exhaust gases 116 may reduce a static pressure within the throat 146 of the venturi portion 126 so as to generate a suction force that is applied to the aspiration tube 132, thereby drawing the aspirated airflow 140 through the aspiration passage 138 and aspirating or providing a vacuum to the pre-cleaner 106. The vacuum applied to the pre-cleaner 106 via the aspiration tube 132 may, in turn, draw particles out of the intake air 104 flowing through the pre-cleaner 106.

In other situations, the volume of the exhaust gases 116 flowing through the venturi portion 126 may be too high for the cross-sectional area of the throat 146 of the venturi portion 126 and may, thus, create an increased pressure zone forward of the throat 146. Such a situation may cause undesirable backpressure within the exhaust passage 124, which may propagate towards the upstream end 120 of the exhaust tube 114 and negatively impact engine performance for the work vehicle 10, such as reducing fuel efficiency. For instance, in high RPM and/or high power output conditions of the engine 30, such as when the engine 30 is loaded above an ideal operating condition, the speed and/or velocity of the exhaust gases 116 may be too high. In such instance, throttling the exhaust gases 116 too much at the throat 146 may create a high pressure zone forward of and/or inside of the converging section 142 of the venturi portion 126. This may be particularly true when the cross-sectional area of the throat 146 of the venturi portion 126 has been reduced to provide the desired aspiration level at low RPMs and/or power outputs of the engine 30. In such instance, the flow adjustment mechanism 150 may be used to increase the cross-sectional area of the exhaust passage 124 at the throat 146, thereby decreasing the localized speed of the exhaust gases 116 flowing around the outlet end 148 of the aspiration tube 132, but increasing the general flow of exhaust gases 116 through the exhaust passage 124. As such, increasing the cross-sectional flow area at the throat 146 may decrease backpressure within the exhaust passage 124.

Referring to the embodiment of FIG. 3, the venturi portion 126 may include an adjustable surface defining a cross-sectional flow area 162 of the venturi portion 126 of the exhaust tube 114. The adjustable surface may, in one embodiment, define the minimum cross-sectional flow area 162 of the venturi portion 126 (e.g., the cross-sectional flow area at the throat 146). As one example, the adjustable surface of the venturi portion 126 of the exhaust tube 114 may be configured as a flexible venturi tube portion 156. For instance, the converging section 142, the throat 146, and/or the diverging section 144 may each be formed from the same or different flexible venturi tube portions 156, which may allow for the cross-sectional flow area 162 of the venturi portion 126 to be adjusted. In one example, at least the throat 146 of the venturi portion 126 of the exhaust tube 114 may be formed from the flexible venturi tube portion 156 in order to allow the cross-sectional flow area 162 at the throat 146 to be adjusted. In at least one embodiment, the throat 146 may be formed from the flexible venturi tube portion 156 while the converging section 142 and/or the diverging section 144 may formed from rigid exhaust tube portion(s). The flexible venturi tube portion 156 may include one or more fabrics, carbon fiber meshes, or other weaves, breads, or the like including flame resistant fibers such as Nomex® or Kevlar® produced by DuPont, fiberglass, carbon, or the like. However, it should be appreciated that the flexible venturi tube portion 156 may be formed, at least in part, from any material suitable to allow the cross-sectional flow area 162 to be altered while also being able to withstand the temperature and chemical composition of the exhaust gases 116.

The flow adjustment mechanism 150 is generally configured to adjust the cross-sectional flow area 162 of the venturi portion 126 of the exhaust tube 114. For example, the flow adjustment mechanism 150 may be configured to adjust the cross-sectional flow area 162 at the throat 146 of the venturi portion 126. As explained above, by restricting the cross-sectional flow area 162 at the throat 146 of the venturi portion 126, the flow adjustment mechanism 150 may adjust the speed of the exhaust gases 116 and thus the static pressure of the exhaust gases 116 flowing through the venturi portion 126. Additionally, as shown, the flow adjustment mechanism 150 may be positioned radially outward from the adjustable surface, such as the flexible venturi tube portion 156, relative to the centerline 160 of the venturi portion 126. As such, the flow adjustment mechanism 150 may constrict, compress, or otherwise squeeze the flexible venturi tube portion 156 in order to reduce the cross-sectional flow area 162. Additionally, the flow adjustment mechanism 150 may dilate, release the compression applied to the flexible venturi tube portion 156, or otherwise expand the flexible venturi tube portion 156 in order to increase the cross-sectional flow area 162 of the throat 146.

As shown in FIG. 3, in one embodiment, the flow adjustment mechanism 150 may include one or more venturi actuators 152 (e.g., two venturi actuators 152 in the embodiment of FIG. 3) arranged around the flexible venturi tube portion 156 and configured to actuate or compress the flexible venturi tube portion 156 when a reduction of the cross-sectional flow area 162 of the throat 146 is desired. In general, the venturi actuator(s) 152 may correspond to an electric, hydraulic, pneumatic, or any other actuator(s) suitably configured to adjust the cross-sectional flow area 162 of the flexible venturi tube portion 156. In one instance, a plurality of venturi actuators 152 may circumferentially inscribe the flexible venturi tube portion 156 relative to the centerline 160. As shown, the venturi actuator(s) 152 may be powered or otherwise activated in order to reduce a diameter of the throat 146 from a first diameter 154 to a second diameter 158, smaller than the first diameter 154. As such, the cross-sectional flow area 162 may be decreased, thereby reducing the static pressure within the throat 146 and increasing the aspiration of the pre-cleaner 106. Contrarily, when the backpressure within the exhaust tube 114 is too high, the venturi actuator(s) 152 may be powered or otherwise activated in order to expand the diameter (e.g., from the second diameter 158 to the first diameter 154). As such, the cross-sectional flow area 162 may be increased, thereby increasing the general flow of exhaust gases 116 through the exhaust passage 124 and decreasing the backpressure within the exhaust tube 114.

In several embodiments, the flexible venturi tube portion 156 may be resilient or elastic such that when the venturi actuator(s) 152 is retracted, the flexible venturi tube portion 156 automatically returns to an original shape, such as a shape having the first diameter 154, or approximately its original shape. In additional or alternative embodiments, the venturi actuator(s) 152 may be coupled to the flexible venturi tube portion 156 such that retracting the venturi actuator(s) 152 pulls radially outwardly on the flexible venturi tube portion 156 relative to the centerline 160 to expand the cross-sectional flow area 162. While two diameters 154, 158 representing two cross-sectional flow areas 162 are illustrated in the embodiment of FIG. 3, it should be recognized that the flow adjustment mechanism 150 may be configured to adjust the cross-sectional flow area 162 to any desired value suitable for the aspiration level and/or acceptable backpressure within the exhaust passage 124.

Figure 4:
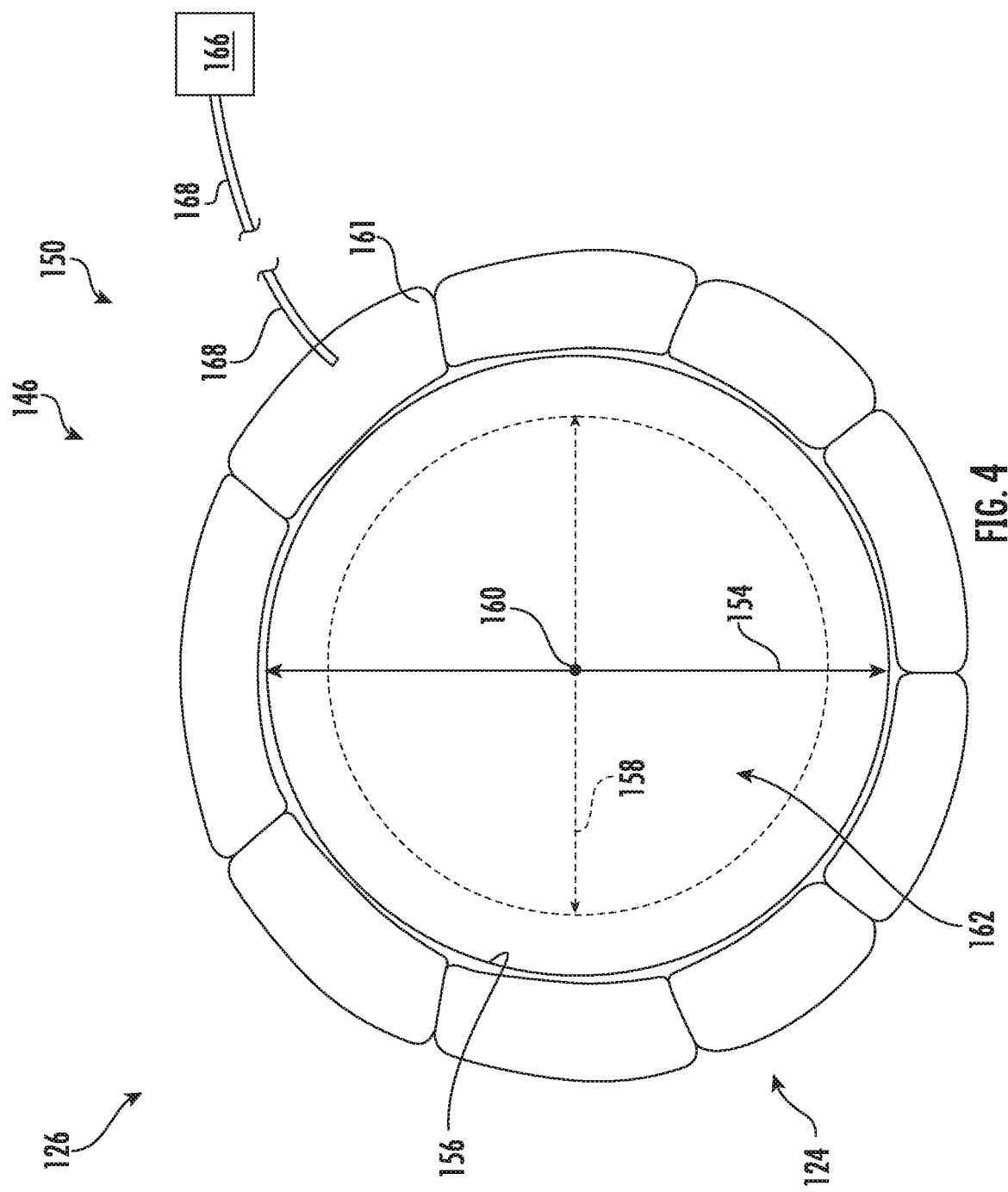
FIG. 4 illustrates a cross-sectional view of another embodiment of a venturi portion of an exhaust tube suitable for use within the disclosed aspiration system in accordance with aspects of the present subject matter, particularly illustrating another embodiment of a flow adjustment mechanism of the aspiration system.

Referring now to FIG. 4, a cross-sectional view of an additional or alternative embodiment of the throat 146 of the venturi portion 126 as described above with reference to FIG. 2 is illustrated in accordance with aspects of the present subject matter. Particularly, FIG. 4 illustrates an embodiment of a flow adjustment mechanism configured as a bladder. However, it should be appreciated that the aspects of venturi portion 126 and throat 146 may be utilized within any suitable aspiration system 100 of a given work vehicle 10. The venturi portion 126 of FIG. 4 may generally be configured the same as or similar to the venturi portion 126 of FIG. 3. For instance, the venturi portion 126 may include an adjustable surface, such as a flexible venturi tube portion 156, defining a cross-sectional flow area 162 at the throat 146 such that the flexible venturi tube portion 156 may be adjusted in order to adjust an aspiration level provided to the pre-cleaner 106 (FIG. 2) by the aspiration passage 138, omitted for clarity, and/or to adjust the backpressure within the exhaust tube 114.

As shown in FIG. 4, a flow adjustment mechanism 150 may be provided in operative association with the venturi portion 126 in order to adjust the cross-sectional flow area 162 of the venturi portion 126. As explained above, by restricting the cross-sectional flow area 162 at the throat 146 of the venturi portion 126, the flow adjustment mechanism 150 may adjust the speed of the exhaust gases 116 and thus the static pressure of the exhaust gases 116 flowing through the venturi portion 126 and/or adjust the backpressure within the exhaust tube 114. Additionally, as shown, the flow adjustment mechanism 150 may be positioned radially outward of the flexible venturi tube portion 156, relative to the centerline 160 of the venturi portion 126. In the embodiment of FIG. 4, the flow adjustment mechanism 150 is includes a bladder 161 configured to compress the flexible venturi tube portion 156 when a reduction of the cross-sectional flow area 162 of the venturi portion 126 is desired, such as at the throat 146.

Generally, a pressure source may be provided in operative association with the bladder 161. As such, the pressure source may be configured to alter a pressure of a fluid within the bladder 161 in order to adjust the compressive force provided by the bladder 161 on the venturi portion 126, and thus the cross-sectional flow area 162. In the embodiment of FIG. 4, the pressure source is configured as a compressor 166. However, in additional or alternative embodiments, the pressure source may generally be configured as any suitable fan, compressor, pump, or the like configured to move a volume of fluid and/or increase the pressure of a fluid associated with the bladder 161. In one embodiment, the compressor 166 may correspond to a dedicated pressure source coupled to the work vehicle 10 to selectively provide pressurized fluid to the bladder 161. Furthermore, a fluid line 168 may be fluidly coupled between the compressor 166 and the bladder 161 in order to provide pressurized fluid to the bladder 161 and/or drain such fluid from the bladder 161.

When it is desired to reduce the static pressure of the exhaust gases 116 in the throat 146 of the venturi portion 126, and thus increase the aspirated airflow 140 (FIG. 2), the bladder 161 may be pressurized to reduce the cross-sectional flow area 162. For example, the compressor 166 may be powered in order to provide pressurized fluid to the bladder 161. By increasing the pressure within the bladder 161, the bladder 161 may compress the flexible venturi tube portion 156.

Furthermore, by applying the compression on the exterior of the flexible venturi tube portion 156, the venturi portion 126 may contract. For example, the flexible venturi portion 156 may define a first diameter 154 before such compression and a second diameter 158 after such compression.

Contrarily, when it is desired to reduce the backpressure within the exhaust tube 114, the bladder 161 may be depressurized to increase the cross-sectional flow area 162. For instance, the compressor 166 may be reversed in order to suck out at least a portion of the fluid within the bladder 161. Additionally, or alternatively, at least one of the bladder 161, fluid line 168, or compressor 166 may include a drain, valve, or the like that may selectively be opened to reduce the pressure within the bladder 161. By reducing the pressure within the bladder 161, the compression of the bladder 161 on the flexible venturi tube portion 156 may be reduced or, in certain situations, eliminated. In such embodiments, the flexible venturi tube portion 156 may be resilient or otherwise elastic such that the flexible venturi tube portion 156 expands as the external pressure from the bladder 161 is reduced. As such, the cross-sectional flow area 162 may increase as the pressurization of the bladder is decreased. For example, the diameter of the cross-sectional flow area 162 may increase from the second diameter 158 to the first diameter 154 as the pressure of the bladder 161 is reduced.

Figure 5:
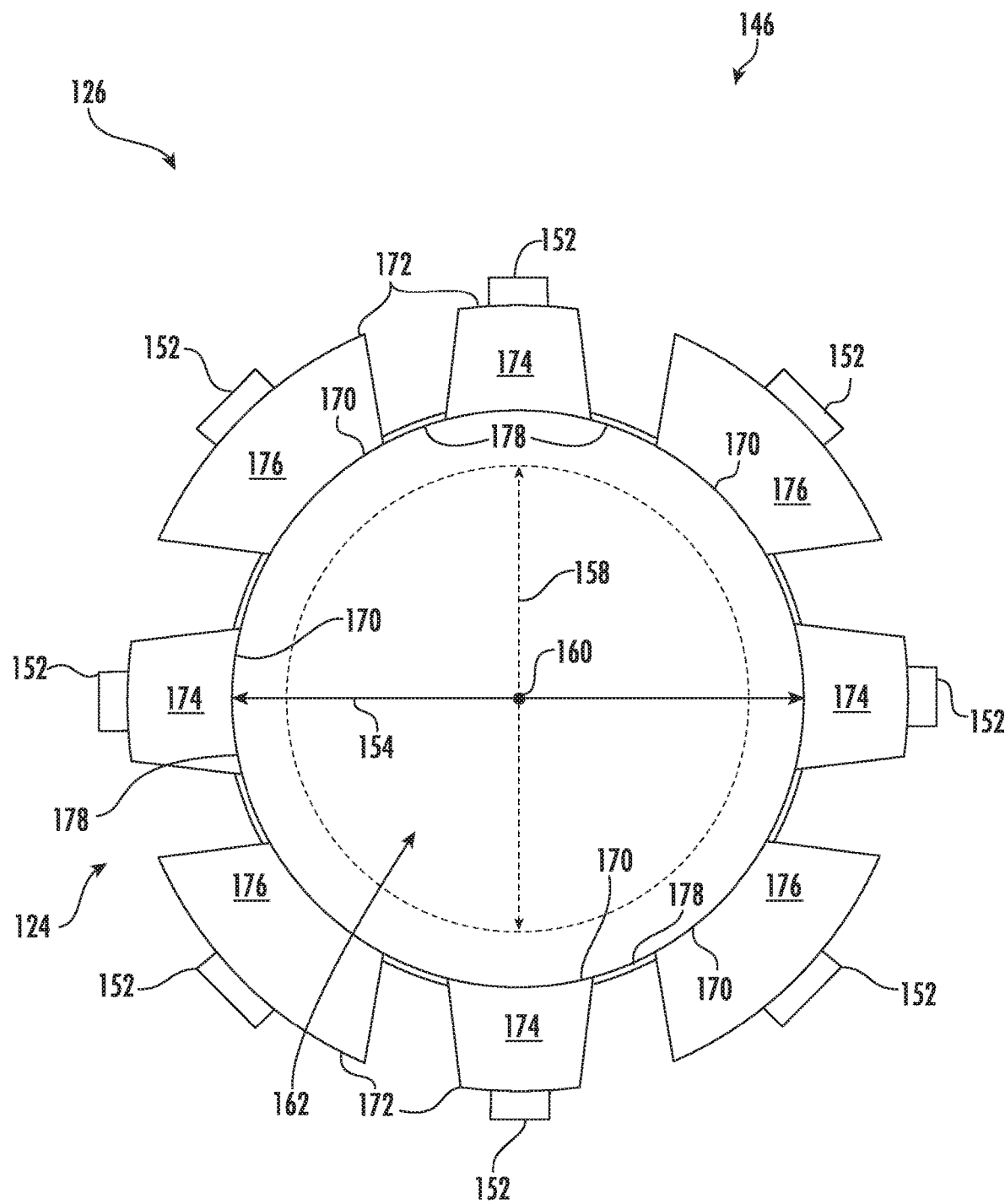
FIG. 5 illustrates a cross-sectional view of a still further embodiment of a venturi portion of an exhaust tube suitable for use within the disclosed aspiration system in accordance with aspects of the present subject matter, particularly illustrating yet another embodiment of a flow adjustment mechanism of the aspiration system.

Referring now to FIG. 5, a cross-sectional view of an additional or alternative embodiment of the throat 146 of the venturi portion 126 as described above with reference to FIG. 2 is illustrated in accordance with aspects of the present subject matter. Particularly, FIG. 5 illustrates venturi portion 126 including a plurality of adjustable surfaces, which define the cross-sectional flow area 162. However, it should be appreciated that the aspects of venturi portion 126 and throat 146 may be utilized within any suitable aspiration system 100 of a given work vehicle 10. The venturi portion 126 of FIG. 5 may generally be configured the same as or similar to the venturi portion 126 of FIGS. 3 and 4. For instance, the venturi portion 126 may define a cross-sectional flow area 162 at the throat 146. However, rather than a flexible venturi tube portion 156, the venturi portion 126 of FIG. 5 may include a plurality of adjustable surfaces 170 defining the cross-sectional flow area 162. For example, as shown, the adjustable surfaces 170 may correspond to inner surfaces of a plurality of segments 172 movable (such as via venturi actuators 152 of the flow adjustment mechanism 150 as described below) in order to adjust the size of the cross-sectional flow area 162. In one embodiment, the segments 172 may include metal segments. However, the segments 172 may be formed from any suitable material. As such, the cross-sectional flow area 162 of the venturi portion 126 may be adjusted in order to adjust an aspiration level provided to the pre-cleaner 106 (FIG. 2) by the aspiration passage 138, omitted for clarity, and/or to adjust the back-pressure within the exhaust tube 114.

In one embodiment, as shown, the segments 172 may include first segments configured to converge as they extend radially outward from a centerline 160 of the venturi portion 126 (converging segments 174). Additionally, the segments 172 may include second segments configured to diverge as they extend radially outward from the centerline 160 of the venturi portion 126 (diverging segments 176). As such, the segments 174, 176 may define circumferential gaps between the segments 174, 176 relative to the centerline 160 when the cross-sectional flow area 162 is larger. As the cross-sectional flow area 162 is reduced, the converging and diverging nature of the segments 174, 176 may allow for the segments 174, 176 to interlock, such as at a minimum cross-sectional flow area 162 of the throat 146 of the venturi portion 126. In the embodiment of FIG. 5, the diverging segments 176 are illustrated as larger than the converging segments 174. However, in further embodiments, the segments 174, 176 may be the same or approximately the same size, or the converging segments 174 may be larger than the diverging segments 176. Additional, though not shown in the embodiment of FIG. 5, each of the segments 172 may define, at least in part, the converging section 142 (FIG. 3) of the venturi portion 126 toward the upstream end 120 of the exhaust tube 114. Further, each of the segments 172 may define, at least in part, the diverging section 144 (FIG. 3) of the venturi portion 126 toward the downstream end 122 of the exhaust tube 114. As such, the segments 172 may define generally trapezoidal shapes within a plan along the centerline 160 and radial direction relative to the centerline 160.

As further illustrated, the adjustable surfaces 170 may generally define the cross-sectional flow area 162 of the venturi portion 126. For example, the adjustable surfaces 170 may define the exhaust passage 124 through the venturi portion 126. Specifically, when at a minimum cross-sectional flow area 162, the adjustable surfaces 170 of the segments 172 may touch or approximately touch to define the cross-sectional flow area 162. Additionally, it should be appreciated that an interference fit between the converging and diverging segments 174, 176 may generally seal or approximately seal the venturi portion 126 at the minimum cross-sectional flow area 162 to define the exhaust passage 124. In one embodiment, seal elements 178 may be positioned between and/or coupled between segments 172 in order to define the exhaust passage 124 when the cross-sectional flow area 162 is not at the minimum, e.g., when the segments 174, 176 are not interlocked. For example, when the cross-sectional flow area 162 is larger, segments 172 would not touch and thus would not effectively direct and accelerate the exhaust gases 116 through the throat 146 of the venturi portion 126. Additionally, it should be appreciated that the interference fit created by the segments 172 at the minimum cross-sectional flow area 162 may not be sufficient to seal the venturi portion 126 to the degree desired or required without the seal elements 178. As such, the seal elements 178 may generally include elastic seals between the segments 172 that are configured to stretch to accommodate the changing cross-sectional flow area 162, and thus a changing distance between segments 172. However, other configurations of the seal elements 178 are contemplated herein and may occur to one of ordinary skill in the art. For instance, the seal elements 178 may be compressible elements arranged between segments 172 or may be configured to fold as the distance between segments 172 decreases and unfold as such distance increases.

As further illustrated in FIG. 5, a flow adjustment mechanism 150 may be provided in association with the segments 172 to adjust the cross-sectional flow area 162 of the venturi portion 126. For instance, the flow adjustment mechanism 150 may include a plurality of venturi actuators 152 positioned radially outward of the adjustable surfaces 170 relative to the centerline 160 of the venturi portion 126. Further, each venturi actuator 152 may be associated with and adjust the radial position of one of the adjustable surfaces 170 of the venturi portion 126 relative to the centerline 160. For example, a venturi actuator 152 may be provided in association with each of the segments 172 to extend its respective segment 172 radially toward the centerline 160 to reduce the cross-sectional flow area 162. Additionally, the venturi actuator 152 associated with each segment 172 may retract its respective segment 172 radially outward away from the centerline 160 to increase the cross-sectional flow area 162. Further, it should be appreciated that the venturi actuators 152 may be synchronized such that they extend and/or retract the segments 172 to the same or similar degrees. For example, the venturi actuators 152 may be powered or otherwise activated in order to extend the segments 172 toward the centerline 160 and thus alter a diameter of the cross-sectional flow area 162 from a first diameter 154 to a second diameter 158, smaller than the first diameter 154. Contrarily, the venturi actuators 152 may be powered or otherwise activated in order to retract the segments 172 away from the centerline 160 and thus alter the diameter of the cross-sectional flow area 162 from the second diameter 158 to the first diameter 154.

In additional or alternative embodiments, the venturi actuators 152 may have any suitable configuration to extend or retract the adjustable surfaces 170 in the radial direction relative to the centerline 160. For instance, the venturi actuators 152 may be arranged between segments 172 to alter the gap between such segments 172 and thus reduce or increase the cross-sectional flow area 162 as desired.

It should be appreciated that FIGS. 3-5 provide examples of various different configurations of venturi portions of exhaust tubes and associated flow adjustment mechanisms. It should be appreciated that, in alternative embodiments, the venturi portion and flow adjustment mechanism may have any other suitable configurations such that the cross-sectional flow area may be altered in order to change the static pressure of the exhaust gases flowing through the venturi portion and thus adjust the aspirated airflow generated by such venturi portion.

Figure 6:
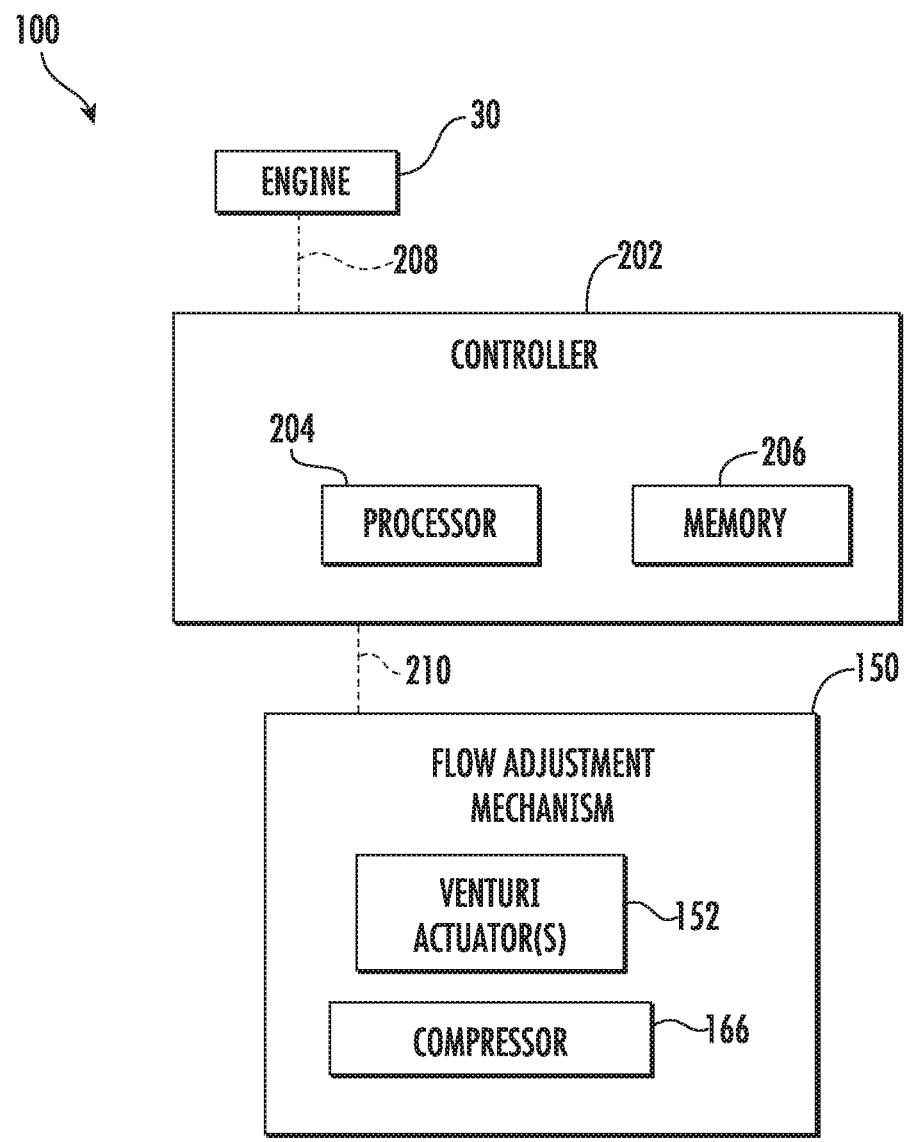
FIG. 6 illustrates a schematic view of one embodiment of an aspiration system for a work vehicle in accordance with aspects of the present subject matter.

Referring now to FIG. 6, a schematic view of one embodiment of an aspiration system 100 for aspirating a component of a work vehicle is illustrated in accordance with aspects of the present subject matter. In general, aspiration system 100 will be described with reference to the work vehicle 10 and aspiration system 100 described with reference to FIGS. 1 and 2. Further, the system 100 will be described with reference to the embodiments of the venturi portions 126 and flow adjustment mechanisms 150 described above with reference to FIGS. 3-5. However, it should be appreciated by those of ordinary skill in the art that the disclosed system 100 may generally be utilized with work vehicles and/or venturi portions and associated flow adjustment mechanism having any other suitable work vehicle, venturi portion, or flow adjustment mechanism configurations, respectively.

In several embodiments, the system 100 may include a controller 202 and various other components configured to be communicatively coupled to and/or controlled by the controller 202, such as one or more venturi actuators 152, a compressor 166, and/or various components of the work vehicle 10, such as the engine 30. In general, the controller 202 may comprise any suitable processor-based device known in the art, such as a computing device or any suitable combination of computing devices. Thus, in several embodiments, the controller 202 may include one or more processor(s) 204 and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 206 of the controller 202 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 206 may generally be configured to store suitable computer-readable instructions that, when implemented by the processor(s) 204, configure the controller 202 to perform various computer-implemented functions, such as one or more aspects of the method 300 described below with reference to FIG. 7. In addition, the controller 202 may also include various other suitable components, such as a communications circuit or module, one or more input/output channels, a data/control bus and/or the like.

It should be appreciated that the controller 202 may correspond to an existing controller of the work vehicle 10 or the controller 202 may correspond to a separate processing device. For instance, in one embodiment, the controller 202 may form all or part of a separate plug-in module that may be installed within the work vehicle 10 to allow for the disclosed system and method to be implemented without requiring additional software to be uploaded onto existing control devices of the work vehicle 10.

In accordance with aspects of the present subject matter, the controller 202 may be configured to control the operation of a flow adjustment mechanism 150 associated with a venturi portion 126 of an exhaust tube 114 based on whether the cross-sectional flow area 162 of the venturi portion 126, such as at a throat 146 of the venturi portion 126, should be decreased or increased. As described generally above, restricting the cross-sectional flow area 162 utilizing the flow adjustment mechanism 150 may generally increase the velocity of exhaust gases 116 flowing through the throat 146 of the venturi portion 126 of the exhaust tube 114. As such, the static pressure of such flow through the throat 146 may be reduced in order to generate or increase an aspirated airflow 140 through an aspiration tube 132. For example, the aspirated airflow 140 may be maintained or increased in order to remove particulates from an associated air filtration system 102, such as a pre-cleaner 106 of the air filtration system 102. In another instance, as described above, expanding the cross-sectional flow area 162 utilizing the flow adjustment mechanism 150 may generally decrease the velocity of of the exhaust gases 116 through the venturi portion 126 of the exhaust tube 114 and thus decrease or eliminate a backpressure of such exhaust gases 116 within the exhaust tube 114. However, it should be appreciated that decreasing the velocity of the exhaust gases 116 at the venturi portion 126 may also increase the static pressure of the exhaust gases 116 through the venturi portion 126, thereby decreasing the vacuum level and supply of aspirated airflow 140. As such, the controller 202 may be configured to maintain or increase the vacuum level of the aspirated airflow 140, while also balancing the need to decrease or maintain backpressure within the exhaust tube 114 to acceptable levels.

As shown in FIG. 6, the controller 202 may be communicatively coupled to the flow adjustment mechanism 150, via a wired or wireless connection, to allow control signals (e.g., indicated by dashed lines 210 in FIG. 6) to be transmitted from the controller 202 to the flow adjustment mechanism 150. As such, the controller 202 may be configured to transmit control signals 210 to the flow adjustment mechanism 150 or associated components instructing the flow adjustment mechanism to decrease or increase the cross-sectional flow area 162 of the venturi portion 126. For example, as described above with reference to FIG. 3, the venturi portion 126 may include a flexible venturi tube portion 156. In such instance, one or more venturi actuators 152 may be powered or otherwise activated to extend and compress the flexible venturi tube portion 156 (reducing the cross-sectional flow area 162) or retract, increasing the cross-sectional flow area 162 of the flexible venturi tube portion 156. In another embodiment, such as the embodiment described above with reference to FIG. 4, a compressor 166 may be powered in order to increase the pressure of a fluid within a bladder 161 surrounding the flexible venturi tube portion 156 and thus compress the flexible venturi tube portion 156. Alternatively, the compressor 161 may be reversed and/or an associated drain, valve, or the like that may selectively be opened to reduce the pressure of the fluid within the bladder 161, thereby allowing the flexible venturi tube portion 156 to expand. In a further embodiment, such as the embodiment described above with reference to FIG. 5, the venturi portion 126 may include a plurality of adjustable surfaces 170. For instance, the cross-sectional flow area 162 of the venturi portion 126 may be defined by a plurality of adjustable wedges 172. In such instance, a venturi actuator 152 associated with each wedge 172 may be powered or otherwise activated to extend and retract the associated adjustable wedge 172. By extending the wedge 172 radially inward toward a centerline 160 of the of the venturi portion 126, the cross-sectional flow area 162 may be reduced. Furthermore, by retracting the wedge 172 radially away outward away from the centerline 160 of the venturi portion 126, the cross-sectional flow area 162 may be increased.

In several embodiments, the controller 202 may be configured to monitor an operating parameter of the engine 30 and control the operation of the flow adjustment mechanism 150 based on the monitored engine parameter. Specifically, as shown in FIG. 6, the controller 202 may be communicatively coupled to the engine 30 via wired or wireless connection to allow operating parameter data (e.g., indicated by dashed lines 208 in FIG. 6) to be transmitted from the engine 30 to the controller 202. For example, in one embodiment, the data 208 may be indicative of an RPM value for the engine 30 or a power output for the engine 30. Based on such engine parameter data 208, the controller 202 may then be configured determine a desirable cross-sectional flow area 162 for the venturi portion 126. For instance, the controller 202 may include a look-up table or suitable mathematical formula stored within its memory 206 that correlates the data 208 indicative of the operating parameter of the engine 30 to the mass flow of the exhaust gases 116 through the exhaust tube 114. Additionally or alternatively, the controller 202 may include a look-up table or suitable mathematical formula stored within its memory 206 that correlates the mass flow or engine parameter to a suitable cross-sectional flow area 162 of the venturi portion 126 that may generate or maintain a low pressure zone or vacuum within the venturi portion 126 such that the aspirated airflow 140 generated by such vacuum is sufficient to aspirate the pre-cleaner 106 to the degree required or desired. Further, as explained above, the controller 202 may be configured to power or otherwise actuate the flow adjustment mechanism 150 or components thereof to adjust the cross-sectional flow area 162 based at least in part the monitored engine parameter and/or the determined cross-sectional flow area 162. For example, the controller 202 may be configured to maintain or approximately maintain a predetermined vacuum level within the venturi portion 126 by adjusting the cross-sectional flow area 162 based on the monitored engine parameter.

Furthermore, in several embodiments, the controller 202 may also be configured to maintain a backpressure of the exhaust gases 116 flowing through the exhaust tube 114 within an acceptable range. For instance, the controller 202 may further include a look-up table or suitable mathematical formula stored within its memory 206 that correlates the mass flow, engine parameter, and/or suitable cross-sectional flow area 162 of the venturi portion 126 to the backpressure of the exhaust gases 116. As such, when the controller 202 identifies that the backpressure is outside of the acceptable range, such as over a predetermined threshold, the controller 202 may be configured to adjust the cross-sectional flow area 162 to reduce the backpressure. As explained above, the controller 202 may be configured to power or otherwise actuate the flow adjustment mechanism 150 or one or more components thereof to adjust the cross-sectional flow area 162 based at least in part the monitored engine parameter, the determined cross-sectional flow area, and/or the backpressure. In one embodiment, it should be appreciated that the monitored engine parameter may include data 208 indicative of the backpressure within the exhaust tube 114 acting on the engine 30. As such, the controller 202 may be configured to adjust the cross-sectional flow area 162 based on such monitored backpressure to maintain the backpressure below the predetermined threshold.

Figure 7:
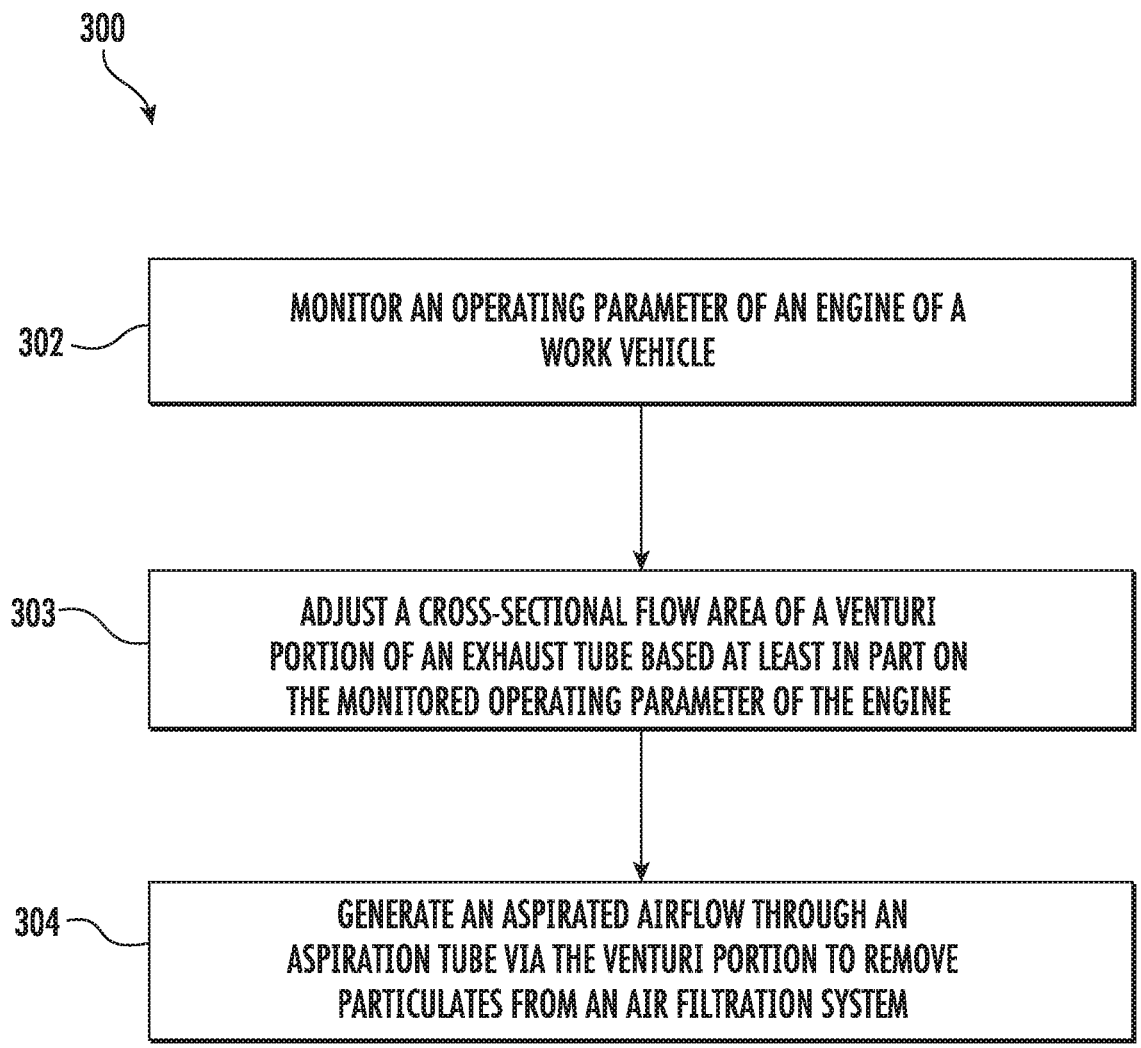
FIG. 7 is a flow chart illustrating one embodiment of a method for aspirating an air filtration system of a work vehicle in accordance with aspects of the present subject matter.

Referring now to FIG. 7, a flow diagram of one embodiment of a method 300 for aspirating an air filtration system of a work vehicle is illustrated in accordance with aspects of the present subject matter. In general, the method 300 will be described herein with reference to the work vehicle 10, the aspiration system 100, and venturi portions 126 described above with reference to FIGS. 1-6. However, it should be appreciated by those of ordinary skill in the art that the disclosed method 300 may generally be utilized in association with work vehicles, aspiration systems, and venturi portions having any suitable configuration and/or as part of a system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

At (302), the method 300 may include monitoring an operating parameter of an engine of a work vehicle. For instance, as described above, the controller 202 may be communicatively coupled to the engine 30 in order to receive data 208 indicative of an RPM value, power output, and/or backpressure acting on the engine 30. As such, the controller 202 may be configured to monitor the engine parameter based on the sensor data 208 received from the engine 30.

At (303), the method 300 may include adjusting a cross-sectional flow area of a venturi portion of the exhaust tube based at least in part on the monitored operating parameter of the engine. For example, as described above, the controller 202 may be configured to transmit control signals 210 to a flow adjustment mechanism 150 based on the monitored operating parameter of the engine 30. In one instance, the controller 202 may be configured to determine a desirable cross-sectional flow area 162 of the venturi portion 126 to maintain a predetermined vacuum level based on the monitored engine parameter, such as the power output. Furthermore, the controller 202 may be configured to transmit control signals 210 to the flow adjustment mechanism 150 to adjust the cross-sectional flow area 162 of the venturi portion 126 such that a flow velocity of exhaust gases 116 flowing through the venturi portion 126 is altered to maintain the predetermined vacuum level within the venturi portion 126. Additionally, or alternatively, the controller 202 may be configured to determine a minimum cross-sectional flow area 162 of the venturi portion 126 such that a backpressure of the exhaust gases 116 within the exhaust tube 114 are maintained below a predetermined threshold value based on the monitored engine parameter, such as a monitored backpressure, or determined or calculated backpressure. Furthermore, the controller 202 may be configured to transmit control signals 210 to the flow adjustment mechanism 150 to adjust the cross-sectional flow area 162 of the venturi portion 126 such that the backpressure of the exhaust gases 116 within the exhaust tube 114 are maintained below the predetermined threshold value.

At (304), the method 300 may include generating an aspirated airflow through the aspiration tube via the venturi portion to remove particulates from an air filtration system. For instance, as explained above, the venturi portion 126 of the exhaust tube 114 may be fluidly coupled to an air filtration system 102 via an aspiration tube 132, such as by fluidly coupling the aspiration tube 132 to a pre-cleaner 106 of the air filtration system 102. Generally, the exhaust gases 116 flowing through the venturi portion 126 may be accelerated and thus reduce the static pressure of the exhaust gases 116 at the venturi portion 126. As such, a vacuum may be created at the venturi portion 126 such that aspirated airflow 140 from the air filtration system 102 to the venturi portion 126 is generated in order to remove particulates from the air filtration system 102, such as the pre-cleaner 106. Additionally, by adjusting the cross-sectional flow area 162 at the venturi portion 126, the vacuum level within the venturi portion 126 may be maintained at a level sufficient to remove a required amount of particulates from the air filtration system 102. For example, the cross-sectional flow area 162 may be adjusted to maintain the predetermined vacuum level within the venturi portion 126.

It is to be understood that the steps of the method 300 are performed by the controller 202 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 202 described herein, such as the method 300, is implemented in software code or instructions which are tangibly stored on a tangible computer readable medium. The controller 202 loads the software code or instructions via a direct interface with the computer readable medium or via a wired and/or wireless network. Upon loading and executing such software code or instructions by the controller 202, the controller 202 may perform any of the functionality of the controller 202 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An aspiration system for a work vehicle, the aspiration system comprising:
   an exhaust tube through which an exhaust gas flows in a flow direction, the exhaust tube extending along the flow direction from an upstream end to a downstream end, the exhaust tube defining an exhaust passage extending from the upstream end of the exhaust tube to the downstream end of the exhaust tube, the exhaust tube including a venturi portion;
   an aspiration tube in flow communication with the venturi portion and configured to receive an aspirated airflow;
   a flow adjustment mechanism provided in operative association with the venturi portion such that the flow adjustment mechanism is configured to adjust a cross-sectional flow area of the venturi portion of the exhaust tube; and
   a controller supported relative to the work vehicle and being configured to monitor a backpressure of the exhaust was upstream of the venturi portion relative to a predetermined range, the controller being further configured to control an operation of the flow adjustment mechanism to adjust the cross-sectional flow area of the venturi portion of the exhaust tube when the backpressure of the exhaust gas falls outside the predetermined range.

2. The aspiration system of claim 1, wherein the aspiration tube is configured to receive the aspirated airflow from an air filtration system of the work vehicle, the aspiration tube defining an aspiration passage extending between the air filtration system and the venturi portion of the exhaust tube.

3. The aspiration system of claim 1, wherein an outlet end of the aspiration tube is placed in association with the venturi portion of the exhaust tube such that the exhaust gas flowing through the venturi portion generates the aspirated airflow through the aspiration tube.

4. The aspiration system of claim 1, wherein the flow adjustment mechanism is further configured to adjust a static pressure of the exhaust gas flowing through the exhaust tube at the venturi portion of the exhaust tube.

5. The system of claim 1, wherein the venturi portion of the exhaust tube includes a converging section, a diverging section, and a throat extending between the converging and diverging sections, the flow adjustment mechanism configured to adjust a cross-sectional flow area of the throat of the venturi portion.

6. The aspiration system of claim 1, wherein the venturi portion of the exhaust tube comprises at least one adjustable surface defining, at least in part, the cross-sectional flow area of the venturi portion.

7. The aspiration system of claim 6, wherein the at least one adjustable surface comprises a flexible venturi tube portion of the exhaust tube, and wherein the flow adjustment mechanism is configured to actuate the flexible venturi tube portion to adjust the cross-sectional flow area of the venturi portion of the exhaust tube.

8. The aspiration system of claim 7, wherein the flow adjustment mechanism comprises at least one actuator coupled to the flexible venturi tube portion and configured to adjust the cross-sectional flow area of the venturi portion of the exhaust tube.

9. The aspiration system of claim 7, wherein the flow adjustment mechanism comprises a bladder, a pressure of fluid within the bladder being adjustable to adjust the cross-sectional flow area of the venturi portion of the exhaust tube.

10. The aspiration system of claim 1, wherein the venturi portion of the exhaust tube comprises a plurality of adjustable surfaces defining the cross-sectional flow area of the venturi portion, and wherein the flow adjustment mechanism comprises a plurality of actuators positioned radially outward relative to the plurality of adjustable surfaces, each actuator of the plurality of actuators associated with one of the adjustable surfaces of the plurality of adjustable surfaces, wherein each actuator is configured to adjust the cross-sectional flow area of the venturi portion by extending or retracting the associated adjustable surface in a radial direction relative to a centerline of the venturi portion.

11. The aspiration system of claim 1, wherein the controller is further configured to determine a minimum cross-sectional flow area for the venturi portion to maintain the backpressure of the exhaust gases below a maximum value of the predetermined range, the controller being configured to control the operation of the flow adjustment mechanism to adjust the cross-sectional flow area of the venturi portion based on the determined minimum cross-sectional flow area.

12. A work vehicle, comprising:
   an engine;

an air filtration system configured to filter air provided to the engine;

an exhaust tube through which an exhaust gas from the engine flows in a flow direction, the exhaust tube extending along the flow direction from an upstream end to a downstream end, the exhaust tube defining an exhaust passage extending from the upstream end of the exhaust tube to the downstream end of the exhaust tube, the exhaust tube including a venturi portion;

an aspiration tube fluidly coupled between the air filtration system and the exhaust tube, the aspiration tube defining an aspiration passage extending between the air filtration system and the exhaust tube;

a flow adjustment mechanism provided in operative association with the venturi portion such that the flow adjustment mechanism is configured to adjust a cross-sectional flow area of the venturi portion of the exhaust tube; and a controller supported relative to the work vehicle and being configured to monitor a backpressure of the exhaust gas upstream of the venturi portion relative to a predetermined range, the controller being further configured to control an operation of the flow adjustment mechanism to adjust the cross-sectional flow area of the venturi portion of the exhaust tube when the backpressure of the exhaust gas falls outside the predetermined range.

13. The work vehicle of claim 12, wherein the venturi portion of the exhaust tube comprises at least one adjustable surface defining, at least in part, the cross-sectional flow area of the venturi portion.

14. The work vehicle of claim 13, wherein the at least one adjustable surface comprises a flexible venturi tube portion of the exhaust tube, and wherein the flow adjustment mechanism is configured to actuate the flexible venturi tube portion to adjust the cross-sectional flow area of the venturi portion of the exhaust tube.

15. The work vehicle of claim 12, wherein the venturi portion of the exhaust tube comprises a plurality of adjustable surfaces defining the cross-sectional flow area of the venturi portion, and wherein the flow adjustment mechanism comprises a plurality of actuators, each actuator of the plurality of actuators associated with one of the adjustable surfaces of the plurality of adjustable surfaces, wherein each actuator is configured to adjust the cross-sectional flow area of the venturi portion by extending or retracting the associated adjustable surface in a radial direction relative to a centerline of the venturi portion.

16. The work vehicle of claim 12, wherein the controller is further configured to determine a minimum cross-sectional flow area for the venturi portion to maintain the backpressure of the exhaust gases below a maximum value of the predetermined range, the controller being configured to control the operation of the flow adjustment mechanism to adjust the cross-sectional flow area of the venturi portion based on the determined minimum cross-sectional flow area.

17. A method of aspirating an air filtration system of a work vehicle, the air filtration system including an aspiration tube in fluid communication with an exhaust tube of the work vehicle, the exhaust tube including a venturi portion, the method comprising:

monitoring, with a computing device, a backpressure of an exhaust gas flowing through the exhaust tube upstream of the venturi portion comparing, with the computing device, the backpressure of the exhaust gas to a predetermined range set for the backpressure;

adjusting, with the computing device, a cross-sectional flow area of the venturi portion of the exhaust tube when it is determined that the backpressure of the exhaust gas falls outside the predetermined range; and generating an aspirated airflow through the aspiration tube via the venturi portion to remove particulates from the air filtration system.

18. The method of claim 17, wherein adjusting the cross-sectional flow area of the venturi portion of the exhaust tube comprises adjusting the cross-sectional flow area of the venturi portion of the exhaust tube by controlling, with the computing device, an operation of a flow adjustment mechanism provided in operative association with venturi portion, the flow adjustment mechanism being configured to adjust the cross-sectional flow area of the venturi portion of the exhaust tube.

19. The method of claim 17, further comprising determining, with the computing device, determining a minimum cross-sectional flow area for the venturi portion to maintain the backpressure of the exhaust gases below a maximum value of the predetermined range;

wherein adjusting the cross-sectional flow area of the venturi portion of the exhaust tube comprises adjusting the cross-sectional flow area of the venturi portion based on the determined minimum cross-sectional flow area.

* * * * *